United States Patent [19]

Fujiwara et al.

[11] 4,216,103

[45] Aug. 5, 1980

[54] HIGH DIELECTRIC CONSTANT TYPE CERAMIC COMPOSITION CONSISTING ESSENTIALLY OF $PB(FE_{\frac{1}{2}}NB_{\frac{1}{2}})O_3$-$PB(MG_{\frac{1}{3}}TA_{\frac{2}{3}})O_3$

[75] Inventors: Shinobu Fujiwara, Nikahomachi; Kiyoshi Furukawa; Nobuaki Kikuchi, both of Akita; Osamu Iizawa, Honjo; Hitoshi Tanaka, Nikahomachi; Hisayoshi Ueoka, Yachiyo, all of Japan

[73] Assignee: TDK Electronics Co., Ltd., Tokyo, Japan

[21] Appl. No.: 27,834

[22] Filed: Apr. 6, 1979

[30] Foreign Application Priority Data

| Apr. 13, 1978 | [JP] | Japan | 53-43560 |
| Apr. 24, 1978 | [JP] | Japan | 53-48432 |
| Apr. 24, 1978 | [JP] | Japan | 53-48433 |
| May 6, 1978 | [JP] | Japan | 53-53931 |
| May 6, 1978 | [JP] | Japan | 53-53932 |
| Jun. 6, 1978 | [JP] | Japan | 53-68040 |
| Jun. 20, 1978 | [JP] | Japan | 53-74501 |
| Jul. 3, 1978 | [JP] | Japan | 53-80650 |

[51] Int. Cl.$^2$ .............................................. H01B 3/12
[52] U.S. Cl. .................................... 252/63.2; 106/39.5; 252/63.5
[58] Field of Search ............................ 252/63.2, 63.5; 106/39.5; 361/320, 321

[56] References Cited

U.S. PATENT DOCUMENTS

| 2,805,165 | 9/1957 | Goodman | 106/39.5 |
| 3,116,262 | 12/1963 | Goodman | 106/39.5 X |
| 3,464,785 | 9/1969 | Galasso | 252/63.5 X |
| 3,600,652 | 8/1971 | Riley | 252/63.2 X |
| 3,666,665 | 5/1972 | Chapman et al. | 106/39.5 X |
| 4,078,938 | 3/1978 | Yonezawa et al. | 252/63.5 X |

FOREIGN PATENT DOCUMENTS

46-33269 9/1971 Japan ................................. 252/63.5

OTHER PUBLICATIONS

Yonezawa et al, "Properties of $Pb(Fe_{\frac{2}{3}}W_{\frac{1}{3}})O_3$–$Pb(Fe_{\frac{1}{2}}Nb_{\frac{1}{2}})O_3$ Ceramics", Proc. of the 1st Meeting on Ferroelectric Materials and their Applications.

*Primary Examiner*—Harris A. Pitlick
*Attorney, Agent, or Firm*—Kenyon & Kenyon

[57] ABSTRACT

A novel ceramic composition exhibiting a solid solution structure of $Pb(Fe_{\frac{1}{2}}Nb_{\frac{1}{2}})O_3$-$Pb(Mg_{\frac{1}{3}}Ta_{\frac{2}{3}})O_3$, can be sintered at a low sintering temperature; have a high insulation resistance; have a relatively high dielectric constant in the high dielectric type ceramic dielectrics, and; have a low dielectric loss.

A particular amount of the additives, i.e., $Pb(Mn_{\frac{1}{2}}W_{\frac{1}{2}})O_3$, $Pb(Mn_{\frac{1}{2}}Nb_{\frac{1}{2}})O_3$, MnO, $Pb(Mn_{\frac{1}{3}}Ta_{\frac{2}{3}})O_3$, $Li_2O$, $Cr_2O_3$ and $CeO_2$, is added into the composition mentioned above.

28 Claims, No Drawings

HIGH DIELECTRIC CONSTANT TYPE CERAMIC COMPOSITION CONSISTING ESSENTIALLY OF $Pb(Fe_{\frac{1}{2}}Nb_{\frac{1}{2}})O_3$-$Pb(Mg_{\frac{1}{3}}Ta_{\frac{2}{3}})O_3$ The present invention relates to a ceramic dielectric composition, which can be classified into a high dielectric constant type and a temperature-compensating type, and relates more particularly to the former type ceramic dielectric composition, which is characterized by being sintered at a relatively low temperature, exhibiting a high dielectric constant, a reduced dielectric loss, a low dependence of the properties upon temperature and enhanced insulation resistance. This ceramic dielectric composition is particularly suitable for "high dielectric constant" capacitors of a compact-type with large capacity, such as laminar capacitors.

Most ceramic dielectrics heretofore proposed for high dielectric constant capacitors contain, as the basic ingredient, a compound having a perovskite structure, such as barium titanate ($BaTiO_3$), barium stannate ($BaSnO_3$) and calcium titanate ($CaTiO_3$). Depending upon various requirements in using the dielectrics in the capacitors, an additional element, which constitutes the substitutional solid solution of the basic ingredient, is used for increasing the dielectric constant of ceramic dielectrics. A compound having a structure different from the perovskite structure, can be mixed with the basic ingredient so as to increase the dielectric constant of the ceramic dielectrics. In the most widely used dielectrics, the dielectric constant thereof is increased as mentioned above. In such increase of the dielectric constant, the Curie point of the dielectrics can be adjusted to a value corresponding to that at room temperature, so as to increase the dielectric constant to the maximum value, for example from 4000 to 20000, which can be achieved by a dielectric comprising a particular basic ingredient. The temperature dependence of the dielectric constant of such dielectric is, however, increased by the increase of the dielectric constant. On the other hand, when the temperature dependence of dielectric constant is decreased, the maximum value of dielectric constant is disadvantageously decreased.

Suitable sintering temperatures of the ceramic dielectric compositions mentioned above are generally 1,200° to 1,400° C. Accordingly, a large amount of heat energy is required for sintering. In addition, due to the high sintering temperature of from 1,200° to 1,400° C., the sintering furnace is considerably deteriorated and eroded during the sintering. As a result, the maintainance cost of the sintering furnace becomes, therefore, expensive.

Recently, a ceramic capacitor which is more compact and of more improved capacity, and possesses a high reliability, has been desired in the field, including the communication industry. Thus, a capacitor of a thin ceramic film having a 0.1 to 0.2 mm thickness and a ceramic laminar capacitor composed of a plurality of superimposed laminae, each having a thickness of approximately 50 microns or less, have been put to practical use. In the production of the laminar ceramic capacitor, the laminated dielectric body must be sintered, while the internal electrodes of the ceramic capacitor are inserted in the laminated body. Since the sintering temperature of the conventional ceramic dielectrics exceeds 1,000° C., a noble metal, such as platinum or palladium, or their alloys, had to be used as the internal electrodes, because the stable resistance of the electrodes at a temperature as high as 1,300° C. could be provided by the noble metal.

It is proposed in German Offenlegungsschrift No. 27 01 411 that the sintering temperature of a high dielectric constant type ceramic compositoin be lowered to 1,000° C. or less by preparing the composition from two components, i.e. $Pb(Fe_{\frac{2}{3}}W_{\frac{1}{3}})_xO_3$ and $Pb(Fe_{\frac{1}{2}}Nb_{\frac{1}{2}})_{1-x}O_3$. Since the laminated ceramic capacitor can be produced by a low sintering temperature of less than 1,000° C., according to the proposal in the German Offenlegungsschift cheap materials such as silver, nickel, aluminum, and the like, can be used as the internal electrodes of the capacitor, and therefore, the production cost of the capacitor can advantageously be lowered from that of the prior art.

It is an object of the present invention to provide ceramic dielectric compositions which can be sintered at a low sintering temperature; have a high insulation resistance; have a relatively high dielectric constant in the high dielectric type ceramic dielectrics, and; have a low dielectric loss.

It is another object of the present invention to improve porperties, such as the insulation resistance and of the known, high dielectric constant type ceramic composition, which can be sintered at a low sintering temperature.

It is still another object of the present invention to provide ceramic capacitors of enhanced reliability, i.e. low dependence of insulation resistance upon ambient and sintering temperatures and high breakdown voltage.

It is a further object of the present invention to provide ceramic dielectric compositions particularly suitable for a high dielectric constant type capacitor of a compact and laminar type.

Other objects and advantages will be apparent from the following description.

In accordance with the objects of the present invention there is provided a high dielectric constant type-, ceramic composition, hereinafter referred to as the basic ceramic composition, which comprises from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all percentages being by weight based on the basic ceramic composition. The basic ceramic composition exhibits a solid solution structure of $Pb(Fe_{\frac{1}{2}}Nb_{\frac{1}{2}})O_3$-$Pb(Mg_{\frac{1}{3}}Ta_{\frac{2}{3}})O_3$.

Provided in accordance with the objects of the present invention are the following dielectric compositions, each of which includes an additive in their basic compositions. A. A modified ceramic composition comprises a basic composition of, i.e., from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition. The basic ceramic composition and further comprises $Pb(Mn_{\frac{1}{3}}W_{\frac{1}{3}})O_3$ in an amount of from 0.05 to 5.0 parts by weight based on 100 weight parts of the basic composition.

B. A modified ceramic composition comprises a basic composition of, i.e., from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition, and further comprises $Pb(Mn_{\frac{1}{2}}W_{\frac{1}{2}})O_3$ in an amount of from 0.05 to 5.0 parts by weight based on 100 weight parts of the basic composition.

C. A modified ceramic composition comprises a basic composition of i.e., from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition, and further comprises $Pb(Mn_{\frac{1}{3}}Nb_{\frac{2}{3}})O_3$ in an amount of from 0.05 to 5.0 parts by weight based on 100 weight parts of the basic composition.

D. A modified ceramic composition which comprises a basic composition of, i.e., from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition, and further comprises MnO in an amount of from 0.001 to 1.0 part by weight based on 100 weight parts of the basic ceramic composition.

E. A modified ceramic composition comprises a basic composition of, i.e., from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition, and further comprises $Pb(Mn_{\frac{1}{3}}Ta_{\frac{2}{3}})O_3$ in an amount of from 0.05 to 5.0 parts by weight based on 100 weight parts of the basic ceramic composition.

F. A modified ceramic composition comprises a basic composition of, i.e., from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition, and further comprises $Li_2O$ in an amount of from 0.01 to 2.0 parts by weight based on 100 weight parts of the basic composition.

G. A modified ceramic composition comprises a basic composition of, i.e., from 60.72 to 67.17% of PbO, from 32.6 to 11.41% of $Fe_2O_3$, from 5.42 to 19.00% of $Nb_2O_5$, from 0.20 to 2.56% of MgO and from 2.22 to 28.04% of $Ta_2O_5$, all these percentages being by weight based on the basic ceramic composition, and further comprises at least one member selected from the group consisting of $Cr_2O_3$ and $CeO_2$ in an amount of from 0.05 to 2.0 parts by weight based on 100 parts of the basic composition.

The properties and the embodiments of the ceramic compositions according to the present invention will now be illustrated.

Every high dielectric constant type ceramic composition according to the present invention can be sintered at a low temperature ranging from 800° to 1000° C. When the PbO content in the ceramic compositions is more than 67.17% by weight, the ceramic compositions must be sintered at a temperature exceeding 1000° C. On the other hand, when the PbO content is less than 60.72% by weight, the dielectric constant of the ceramic composition is too low for the ceramic composition to be used on a practical basis. The sintering temperature of the ceramic compositions is increased when the $Fe_2O_3$ content is more than 11.41% by weight. On the other hand, when the $Fe_2O_3$ content is decreased to less than 3.26% by weight, the dielectric constant is decreased and the ceramic dielectric composition is practically of no use. When the MgO content is more than 2.56% by weight, the dielectric constant is decreased. On the other hand, when the MgO content is less than 0.20% by weight, the dielectric constant is decreased and the dielectric loss (tan δ) is increased. With regard to the $Ta_2O_5$ content, it has been found that the dielectric constant is too low when the $Ta_2O_5$ content is more than 28.04%, while the dielectric constant is decreased when the $Nb_2O_5$ is less than 2.22%. It is therefore apparent that a high dielectric constant, a low sintering temperature and a low dielectric loss are provided when the ceramic compositions of the present invention comprise from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$. This composition correspond although not strictly to a novel solid solution in the field of ceramic dielectrics, i.e., a solid solution of from 30 to 95 mol % of $Pb(Fe_{\frac{1}{2}}Nb_{\frac{1}{2}})O_3$ and from 5 to 70 mol % of $Pb(Mg_{\frac{1}{3}}Ta_{\frac{2}{3}})O_3$.

In the basic ceramic composition which is capable of being sintered at a temperature lower than 1000° C. according to the present invention, the relative dielectric constant ($\epsilon_s$), which is simply referred to as the dielectric constant in the present specification, is from 5000 to 18,000 and therefore high. Furthermore, the dielectric loss (tan δ at 1 KHz) is from 1.0 to 3.6% and therefore low. A preferable basic ceramic composition comprises from 64.0 to 65.0% of PbO, from 6.9 to 8.1% of $Fe_2O_3$, from 11.0 to 14.0% of $Nb_2O_5$, 1.1 to 1.6% of MgO, and from 12.0 to 16.0% of $Ta_2O_5$. In the basic ceramic composition, the insulation resistance is more than $1 \times 10^{10} \Omega$. The preferable basic ceramic composition exhibits an insulation resistance of more than $5 \times 10^{10} \Omega$. The insulation resistance described in to the present specification indicates the resistance of a ceramic composition having a thickness of approximately 0.5 mm. A dielectric current of 500 V is applied to this composition at 20° C. when measureing the resistance.

By adding a particular amount of the additives, i.e., $Pb(Mn_{\frac{1}{2}}W_{\frac{1}{2}})O_3$, $Pb(Mn_{\frac{1}{2}}W_{\frac{1}{2}})O_3$, $Pb(Mn_{\frac{1}{3}}Nb_{\frac{2}{3}})O_3$, MnO, $Pb(Mn_{\frac{1}{3}}Ta_{\frac{2}{3}})O_3$, $Li_2O$, $Cr_2O_3$ and $CeO_2$, into the basic composition, the dielectric loss and the insulation resistance of the modified ceramic compositions can be improved to levels more preferable than those of the basic ceramic composition. When the content of these additives exceeds the maximum amount defined in the description of the modified ceramic compositions, the dielectric constant ($\epsilon_s$) is disadvantageously reduced and the dielectric loss (tan δ) and the insulation resistance are both reduced to levels lower than the level at which the ceramic composition can be used on a practical basis.

It has been established that the addition of the above additives basically exerts an influence on the electrical properties, i.e., $\epsilon_s$ and tan δ, of the ceramic compositions, as mentioned hereinbefore. However, it has also been found that an addition of $Li_2O$, which exceeds the defined maximum amount, into the basic composition will increase the sintering temperature.

A modified ceramic capable composition containing $Pb(Mn_{\frac{1}{2}}W_{\frac{1}{2}})O_3$, and capable of being sintered at a temperature lower 1000° C. exhibits a dielectric constant ($\epsilon_s$) of from approximately 5100 to 18100, a dielectric loss (tan δ at 1 KHz) of from 0.3 to 2.0%, and an insulation resistance of from $1 \times 10^9$ to $6 \times 10^{11}$. The additive content is preferably from 0.5 to 5.0 parts by weight, and the basic composition is preferably from 64.53 to 67.17% by of PbO, from 8.08 to 11.41% of $Fe_2O_3$, from 13.45 to 19.00% of $Nb_2O_5$ from 2.22 to 12.78% of $Ta_2O_5$ and from 0.20 to 1.16% of MgO. The basic composition more preferably comprises from 64.53 to 65% of PbO, from 8.08 to 9% of $Fe_2O_3$, from 13.45 to 14% of $Nb_2O_5$, from 1 to 1.16% of MgO and from 12 to 12.78% of $Ta_2O_5$. The dielectric constant ($\epsilon_s$) is higher than 15000, the dielectric loss (tan δ at 1 KHz) is less than approximately 1.0% and the insulation resistance (IR) is $4 \times 10^{11} \Omega$ or more, when the basic composition fall within the above more preferable range.

Another modified ceramic composition containing an additive of $Pb(Mn_{\frac{1}{3}}W_{\frac{2}{3}})O_3$ capable of being sintered at a temperature lower than 1000° C. exhibits a dielectric constant ($\epsilon_s$) of from approximately 5100 to 18700, a dielectric loss (tan δ at 1 KHz) of from 0.2 to 2.0%, and an insulation resistance of $4 \times 10^8$ or more. The additive content is preferably from 0.05 to 5.0 parts by weight, and the basic composition is preferably from 64.53 to 67.17% of PbO, from 8.08 to 11.41% of $Fe_2O_3$, from 13.45 to 19.00% of $Nb_2O_5$, from 2.22 to 12.78% of $Ta_2O_5$ and from 0.20 to 1.16% of MgO. When the additive content and the basic composition fall within the above respective preferable ranges the dielectric loss (tan δ 1 KHz) is 1.4% or less and the dielectric contant ($\epsilon_s$) is more than 10000. The basic composition more preferably comprises from 64 to 65% of PbO, from 8.08 to 9% of $Fe_2O_3$, from 13.45 to 14% of $Nb_2O_5$, from 1.16 to 2% of MgO and from 12.78 to 13% of $Ta_2O_5$. When the basic components fall within the above-stated more preferable range, the dielectric constant ($\epsilon_s$) is more than 16,000.

A still another modified ceramic composition containing $Pb(Mn_{166} Nb_{170})O_3$ and capable of being sintered at a temperature lower than 1000° C. exhibits a dielectric constant ($\epsilon_s$) of from approximately 4,900 to 17,600, a dielectric loss (tan δ at 1 KHz) of from 0.3 to 2.1%, and an insulation resistance of from $3 \times 10^9$ to $8 \times 10^{11} \Omega$. The additive content is preferably from 0.5 to 5.0 parts by weight, and the basic composition is preferably from 64.53 to 67.17% by weight of PbO, from 8.08 to 11.41% by weight of $Fe_2O_3$, from 13.45 to 19.00% by weight of $Nb_2O_5$, from 0.20 to 1.16% by weight of MgO, and from 2.22 to 12.78% by weight of $Ta_2O_5$. The basic composition is more preferably from 64.53 to 65% by weight of PbO, from 8.08 to 9% by weight of $Fe_2O_3$, from 13.45 to 14% by weight of $Nb_2O_5$, from 1 to 1.16% by weight of MgO, and from 12 to 12.78% by weight of $Ta_2O_5$. When the basic composition falls within the above-stated more preferable range, the dielectric constant is more than 16,000 and the dielectric loss (tan δ at 1 KHz) is 1.2% or less.

A further modified ceramic composition containing MnO and capable of being sintered at a temperature lower than 1000° C. exhibits a dielectric constant ($\epsilon_s$) of from approximately 7,700 to 14,400, a dielectric loss (tan δ at 1 KHz) of from 0.5 to 2.0%, and an insulation resistance of from $9 \times 10^9$ to $7 \times 10^{10} \Omega$. The additive content is preferably from 0.001 to 0.1 part by weight, and the basic composition is preferably from 64.45 to 65.56% PbO, from 6.92 to 9.83% of $Fe_2O_3$, from 11.51 to 15.62% of $Nb_2O_5$, from 0.79 to 1.55% of MgO, and from 8.66 to 15.57% of $Ta_2O_5$. When the additive content fall within the above preferable ranges, the dielectric loss (tan δ at 1 KHz) is 1.2% or less, the insulation resistance is $4 \times 10^{10} \Omega$ or more, and the dielectric constant ($\epsilon_s$) is more than approximately 12,000. The basic composition is more preferably from 64 to 65.56% by weight of PbO, from 8 to 9.83% by weight of $Fe_2O_3$, from 13 to 14% by weight of $Nb_2O_5$, from 1 to 1.55% by weight of MgO, and from 12 to 13% by weight of $Ta_2O_5$. When the basic components fall within the above-stated more preferable range, the dielectric constant ($\epsilon_s$) is approximately, 17,000 and the dielectric loss (tan δ at 1 KHz) is 0.9% or less.

A modified composition containing $Pb(Mn_{\frac{1}{3}}Ta_{\frac{2}{3}})O_3$ and capable of being sintered at a temperature lower than 1000° C. exhibits a dielectric constant ($\epsilon_s$) of from approximately 4,950 to 17,700, a dielectric loss (tan δ at 1 KHz) of from 0.1 to 2.2%, and an insulation resistance of $4 \times 10^9$ to $4 \times 10^{11} \Omega$. The basic composition is preferably from 64 to 65% by weight PbO, from 8 to 9% of $Fe_2O_3$, from 13 to 14% of $Nb_2O_5$ from 1 to 2% MgO, and from 12 to 13% of $Ta_2O_5$. When the basic components fall within the above preferable range, the dielectric loss (tan δ at 1 KHz) is 1.4% or less, the insulation resistance is $7 \times 10^9 \Omega$ or more, and the dielectric constant is approximately 16,000 or more.

A modified composition containing $Li_2O$ and capable of being sintered at from 800° to 950° C. exhibits a dielectric constant ($\epsilon_s$) of from 5600 to 17,400 dielectric loss (tan δ at 1 KHz) of from 0.5 to 1.2%. The additive content is preferably from 0.01 to 0.5 part by weight, and the basic composition is preferably from 64 to 65% PbO, from 8 to 9% of $Fe_2O_3$, from 13 to 14% of $Nb_2O_5$ and from 1 to 2% of MgO. When the additive and basic component and fall within the above preferable ranges, basic composition, the dielectric loss (tan δ at 1 KHz) is 1.2% or less and the dielectric constant ($\epsilon_s$) is approximately 10,000 or more.

A modified composition containing the $Cr_2O_3$ and/or $CeO_2$ additive and capable of being sintered at a temperature lower than 1000° C. exhibits a dielectric constant ($\epsilon_s$) of from approximately 5000 to 10,300, a dielectric loss (tan δ at 1 KHz) of from 0.7 to 2.4%, and an insulation resistance of from $2 \times 10^8$ to $4 \times 10^{10} \Omega$. The additive content is preferably from 0.05 to 2.0 part by weight, and the basic composition is preferably from 67 to 68% of PbO, from 11 to 12% of $Fe_2O_3$, from 18 to 19% of $Nb_2O_5$ and from 0.20 to 1.00% of MgO. When the additive content falls within the above preferable range, the dielectric constant ($\epsilon_s$) is approximately 10,000.

The ceramic compositions according to the present invention exhibit a high insulation resistance and can therefore be used for forming a high-voltage capacitor. In addition, these ceramic compositions can be used in the capacitor as a thin film having a thickness of from 30 to 40 microns. The high insulation resistance can be utifized to solve the problem of electromigration, which causes the properties of a capacitor to be deteriorated, according to the type of ions of a ceramic composition being moved therein under the effect of a voltage applied from the capacitor electrode to the ceramic composition.

One of the properties which must be provided in any capacitor is the property of maintaining a low dependence of the dielectric constant upon temperature. The dielectric constant of the basic composition is decreased by a temperature decrease of from room temperature to −25° C. in an amount not exceeding approximately 60%. This dielectric constant is increased or decreased by a temperature increase of from room temperature to 85° C. in an amount not exceeding approximately 70%. The total change during the temperature decrease and increase mentioned above does not exceed approximately 130%, preferably 100%. The manganese-containing additives can be used to further reduce and thus stabilize the temperature dependence.

One of the properties which must be provided in any PbO containing ceramic is the property of preventing vaporization of the PbO during sintering. The manganese containing additives can effectively prevent the PbO vaporization and can thus contribute to the stabilization of the sintering process.

The ceramic dielectric compositions of the present invention may be prepared as follows. Finely divided particles or powders of respective metal oxides are blended with each other using a ball mill and shaped into a suitable form. After a binder is added to the powders, the powders are press-formed for example, into discs. The discs are sintered at a temperature of from 800° to 1000° C. for a period of one to two hours, enclosed in a magnesia ceramic vessel. Each disc is plated with a silver, nickel or aluminum electrode. Instead of metal oxides, metal carbonates may be used.

The present invention is explained further in detail by way of a single example.

EXAMPLE

In the example, the lead oxide (PbO), magnesium oxide (MgO), iron oxide ($Fe_2O_3$), niobium oxide ($Nb_2O_5$), tantalum oxide ($Ta_2O_5$), manganese oxide (MnO), tungsten oxide ($WO_3$), lithium oxide ($Li_2O$), chronium oxide ($Cr_2O_3$) and cerium oxide ($CeO_2$), all in the powdered form, were weighed so that the oxides were contained in the ceramic composition in the propertion as shown in Table 1, below. These oxide mixtures serving as the raw material of the ceramic composition were blended under a moist condition in a bowl made of an organic resin, and thereafter presintered at a temperature ranging from 700° to 850° C. over a period of two hours. Subsequently, chemical reactions occurred between the powders. The so-reacted sintered powders were crushed to particles having a diameter of a few microns and were blended again with each other so as to obtain a powdered mixture. A predetermined amount of binder of polyvinyl alcohol (PVA) was added into the powdered mixture, which was then shaped under a shaping pressure of approximately 3 tons/$cm^2$ into discs having a diameter of 16.5 mm and a thickness of 0.6 mm. The shaped discs were air-tightly sealed in a magnesia ceramic vessel so as to prevent the lead component from being evaporated from the discs during sintering. The final sintering was carried out over a period of two hours, and ceramic bodies were produced. Thereafter, a silver electrode was baked onto each side of the ceramic bodies. The ceramic bodies with the pair of electrodes were used as samples for measuring electric properties, i.e., the dielectric constant ($\epsilon_s$ at 1 KHz at 20° C.) the dielectric loss (tan δ at 1 KHz) at 20° C. and 85° C.), and the insulation resistance (IR). The temperature dependence of the dielectric constant ($\epsilon_s$ at 1 KHz) was measured with regard to several samples. Such temperature dependence was measured at +85° C., based on the room temperature of 20° C. as the standard value. The measurement results are shown in Table 1, in which the asterisked sample designates the control sample.

Table 1

| Sample No. | Basic Ingredients (mol %) Pb(Fe½Nb½)O₃ | Pb(Mg⅓Ta⅔)O₃ | Additive (wt %) | Proportion of Basic Oxides (wt %) PbO | Fe₂O₃ | Nb₂O₅ | MgO | Ta₂O₅ | $\epsilon_s$ | tan δ 20° C. | 85° C. | IR | ρ(Ω-cm) |
|---|---|---|---|---|---|---|---|---|---|---|---|---|---|
| 1* | 25 | 75 | 0 | 60.27 | 2.70 | 4.49 | 2.72 | 29.81 | 3,200 | 0.8 | 0.4 | 1×10⁸ | 1.1×10¹³ |
| 2 | 30 | 70 | 0 | 60.72 | 3.26 | 5.42 | 2.56 | 28.04 | 5,170 | 1.0 | 0.5 | 8×10⁷ | 4.5×10¹² |
| 3 | 45 | 55 | 0 | 61.98 | 4.99 | 8.30 | 2.24 | 22.49 | 8,650 | 1.5 | 0.5 | 8×10⁷ | 4.5×10¹² |
| 4 | 60 | 40 | 0 | 64.45 | 6.92 | 11.51 | 1.55 | 15.57 | 14,550 | 1.5 | 0.8 | 7×10⁷ | 2.0×10¹² |
| 5 | 70 | 30 | 0 | 64.53 | 8.08 | 13.45 | 1.16 | 12.78 | 18,000 | 1.8 | 0.8 | 5×10⁷ | 1.6×10¹² |
| 6 | 80 | 20 | 0 | 65.56 | 9.83 | 15.62 | 0.79 | 8.66 | 15,400 | 3.2 | 1.1 | 9×10⁷ | 1.1×10¹² |
| 7 | 95 | 5 | 0 | 67.17 | 11.41 | 19.00 | 0.20 | 2.22 | 9,800 | 3.6 | 1.2 | 1×10⁷ | 2.3×10¹¹ |
| 8* | 99 | 1 | 0 | 67.61 | 11.97 | 19.93 | 0.04 | 0.44 | 3,800 | 6.5 | 2.0 | 7×10⁶ | 1.6×10¹¹ |

| Sample No. | Basic Ingredients (mol %) Pb(Fe½Nb½)O₃ | Pb(Mg⅓Ta⅔)O₃ | Additive (wt %) Pb(Mn⅔W⅓)O₂ | Proportion of Basic Oxides (wt %) PbO | Fe₂O₃ | Nb₂O₅ | MgO | Ta₂O₅ | $\epsilon_s$ | tan δ 20° C. | 85° C. | IR | ρ(Ω-cm) |
|---|---|---|---|---|---|---|---|---|---|---|---|---|---|
| 9* | 30 | 70 | 0 | 60.72 | 3.26 | 5.42 | 2.56 | 28.04 | 5,100 | 1.2 | 0.5 | 8×10⁷ | 4.5×10¹² |
| 10 | 30 | 70 | 0.05 | 60.72 | 3.26 | 5.42 | 2.56 | 28.04 | 5,240 | 1.0 | 0.4 | 6×10⁹ | 6.8×10¹² |
| 11 | 30 | 70 | 0.5 | 60.72 | 3.26 | 5.42 | 2.56 | 28.04 | 5,600 | 0.3 | 0.2 | 6×10¹¹ | 1.1×10¹³ |
| 12 | 30 | 70 | 5.0 | 60.72 | 3.26 | 5.42 | 2.56 | 28.04 | 5,100 | 0.6 | 0.3 | 8×10¹⁰ | 1.8×10¹² |
| 13* | 30 | 70 | 10.0 | 60.72 | 3.26 | 5.42 | 2.56 | 28.04 | 3,800 | 3.3 | 1.5 | 5×10⁷ | 1.1×10¹⁰ |
| 14 | 70 | 30 | 0 | 64.53 | 8.08 | 13.45 | 1.16 | 12.78 | 17,600 | 2.0 | 0.8 | 5×10⁷ | 1.6×10¹² |
| 15 | 70 | 30 | 0.05 | 64.53 | 8.08 | 13.45 | 1.16 | 12.78 | 18,000 | 1.2 | 0.6 | 5×10⁹ | 2.3×10¹² |
| 16 | 70 | 30 | 0.5 | 64.53 | 8.08 | 13.45 | 1.16 | 12.78 | 18,100 | 0.6 | 0.3 | 4×10⁷ | 6.8×10¹² |
| 17 | 70 | 30 | 5.0 | 64.53 | 8.08 | 13.45 | 1.16 | 12.78 | 17,800 | 1.0 | 0.5 | 7×10¹⁰ | 9.0×10¹¹ |
| 18 | 70 | 30 | 10.0 | 64.53 | 8.08 | 13.45 | 1.16 | 12.78 | 14,100 | 3.6 | 1.3 | 4×10⁷ | 1.1×10¹⁰ |
| 19 | 95 | 5 | 0 | 67.17 | 11.41 | 19.00 | 0.20 | 2.22 | 9,700 | 3.8 | 1.2 | 1×10⁷ | 2.3×10¹¹ |
| 20 | 95 | 5 | 0.05 | 67.17 | 11.41 | 19.00 | 0.20 | 2.22 | 10,200 | 2.0 | 1.0 | 3×10⁹ | 6.8×10¹¹ |
| 21 | 95 | 5 | 0.5 | 67.17 | 11.41 | 19.00 | 0.20 | 2.22 | 10,000 | 1.4 | 0.8 | 2×10¹¹ | 1.1×10¹² |
| 22 | 95 | 5 | 5.0 | 67.17 | 11.41 | 19.00 | 0.20 | 2.22 | 6,200 | 1.9 | 0.9 | 4×10⁹ | 2.3×10¹¹ |
| 23 | 95 | 5 | 10.0 | 67.17 | 11.41 | 19.00 | 0.20 | 2.22 | 3,700 | 4.4 | 1.7 | 1×10⁷ | 2.3×10⁹ |

| Sample No. | Basic Ingredients (mol %) Pb(Fe½Nb½)O₃ | Pb(Mg⅓Ta⅔)O₃ | Additive (wt %) Pb(Mn½W½)O₂ | Proportion of Basic Oxides (wt %) PbO | Fe₂O₃ | Nb₂O₅ | MgO | Ta₂O₅ | $\epsilon_s$ | tan δ 20° C. | 85° C. | IR | ρ(Ω-cm) |
|---|---|---|---|---|---|---|---|---|---|---|---|---|---|
| 24* | 30 | 70 | 0 | 60.72 | 3.26 | 5.42 | 2.56 | 28.04 | 5,170 | 2.0 | 0.5 | 9×10⁷ | 4.5×10¹² |
| 25 | 30 | 70 | 0.05 | 60.72 | 3.26 | 5.42 | 2.56 | 28.04 | 5,350 | 0.8 | 0.4 | 5×10⁹ | 6.8×10¹² |
| 26 | 30 | 70 | 0.5 | 60.72 | 3.26 | 5.42 | 2.56 | 28.04 | 5,800 | 0.2 | 0.3 | 4×10¹¹ | 1.1×10¹³ |
| 27 | 30 | 70 | 5.0 | 60.72 | 3.26 | 5.42 | 2.56 | 28.04 | 5,100 | 0.6 | 0.3 | 8×10¹⁰ | 1.8×10¹² |

Table 1-continued

| Sample No. | Basic Ingredients (mol %) Pb(Fe½Nb½)O₃ | Basic Ingredients (mol %) Pb(Mg⅓Ta⅔)O₃ | Additive (wt %) Pb(Mn⅓Nb⅔)O₃ | PbO | Fe₂O₃ | Nb₂O₅ | MgO | Ta₂O₅ | $\epsilon_s$ | tan δ 20° C. | tan δ 85° C. | IR | ρ(Ω-cm) |
|---|---|---|---|---|---|---|---|---|---|---|---|---|---|
| 28* | 30 | 70 | 10.0 | 60.72 | 3.26 | 5.42 | 2.56 | 28.04 | 3,900 | 3.2 | 1.0 | $6 \times 10^7$ | $1.4 \times 10^{11}$ |
| 29 | 70 | 30 | 0 | 64.53 | 8.08 | 13.45 | 1.16 | 12.78 | 18,000 | 2.2 | 0.8 | $5 \times 10^7$ | $1.6 \times 10^{12}$ |
| 30 | 70 | 30 | 0.05 | 64.53 | 8.08 | 13.45 | 1.16 | 12.78 | 18,700 | 1.3 | 0.5 | $4 \times 10^8$ | $2.0 \times 10^{12}$ |
| 31 | 70 | 30 | 0.5 | 64.53 | 8.08 | 13.45 | 1.16 | 12.78 | 18,500 | 1.0 | 0.5 | $2 \times 10^{11}$ | $2.0 \times 10^{12}$ |
| 32 | 70 | 30 | 5.0 | 64.53 | 8.08 | 13.45 | 1.16 | 12.78 | 16,700 | 1.2 | 0.6 | $7 \times 10^9$ | $4.5 \times 10^{11}$ |
| 33* | 70 | 30 | 10.0 | 64.53 | 8.08 | 13.45 | 1.16 | 12.78 | 13,200 | 3.6 | 1.2 | $5 \times 10^7$ | $1.1 \times 10^{10}$ |
| 34* | 95 | 5 | 0 | 67.17 | 11.41 | 19.00 | 0.20 | 2.22 | 9,800 | 3.6 | 1.2 | $1 \times 10^7$ | $2.3 \times 10^{11}$ |
| 35 | 95 | 5 | 0.05 | 67.17 | 11.41 | 19.00 | 0.20 | 2.22 | 10,300 | 1.4 | 0.6 | $3 \times 10^9$ | $1.1 \times 10^{12}$ |
| 36 | 95 | 5 | 0.5 | 67.17 | 11.41 | 19.00 | 0.20 | 2.22 | 10,200 | 1.1 | 0.5 | $1 \times 10^{11}$ | $1.8 \times 10^{12}$ |
| 37 | 95 | 5 | 5.0 | 67.17 | 11.41 | 19.00 | 0.20 | 2.22 | 6,700 | 2.0 | 1.0 | $3 \times 10^{10}$ | $6.8 \times 10^{11}$ |
| 38* | 95 | 5 | 10.0 | 67.17 | 11.41 | 19.00 | 0.20 | 2.22 | 3,700 | 4.5 | 2.1 | $1 \times 10^7$ | $4.5 \times 10^9$ |

| Sample No. | Basic Ingredients (mol %) Pb(Fe½Nb½)O₃ | Basic Ingredients (mol %) Pb(Mg⅓Ta⅔)O₃ | Additive (wt %) Pb(Mn⅓Nb⅔)O₃ | PbO | Fe₂O₃ | Nb₂O₅ | MgO | Ta₂O₅ | $\epsilon_s$ | tan δ 20° C. | tan δ 85° C. | IR | ρ(Ω-cm) |
|---|---|---|---|---|---|---|---|---|---|---|---|---|---|
| 39* | 30 | 70 | 0 | 60.72 | 3.26 | 5.42 | 2.56 | 28.04 | 5,100 | 1.2 | 0.5 | $8 \times 10^7$ | $4.5 \times 10^{12}$ |
| 40 | 30 | 70 | 0.05 | 60.72 | 3.26 | 5.42 | 2.56 | 28.04 | 5,320 | 1.0 | 0.4 | $7 \times 10^9$ | $6.8 \times 10^{12}$ |
| 41 | 30 | 70 | 0.5 | 60.72 | 3.26 | 5.42 | 2.56 | 28.04 | 5,390 | 0.3 | 0.3 | $8 \times 10^{11}$ | $1.1 \times 10^{13}$ |
| 42 | 30 | 70 | 5.0 | 60.72 | 3.26 | 5.42 | 2.56 | 28.04 | 4,900 | 0.7 | 0.4 | $3 \times 10^{10}$ | $6.8 \times 10^{11}$ |
| 43* | 30 | 70 | 10.0 | 60.72 | 3.26 | 5.42 | 2.56 | 28.04 | 3,700 | 4.1 | 2.1 | $4 \times 10^7$ | $9.0 \times 10^9$ |
| 44* | 70 | 30 | 0 | 64.53 | 8.08 | 13.45 | 1.16 | 12.78 | 17,600 | 2.0 | 0.8 | $5 \times 10^7$ | $1.6 \times 10^{12}$ |
| 45 | 70 | 30 | 0.05 | 64.53 | 8.08 | 13.45 | 1.16 | 12.78 | 17,800 | 1.0 | 0.5 | $4 \times 10^9$ | $2.0 \times 10^{12}$ |
| 46 | 70 | 30 | 0.5 | 64.53 | 8.08 | 13.45 | 1.16 | 12.78 | 17,900 | 0.5 | 0.3 | $5 \times 10^{11}$ | $2.3 \times 10^{12}$ |
| 47 | 70 | 30 | 5.0 | 64.53 | 8.08 | 13.45 | 1.16 | 12.78 | 16,300 | 1.2 | 0.6 | $3 \times 10^9$ | $1.8 \times 10^{12}$ |
| 48* | 70 | 30 | 10.0 | 64.53 | 8.08 | 13.45 | 1.16 | 12.78 | 13,100 | 3.2 | 1.2 | $4 \times 10^7$ | $1.1 \times 10^{10}$ |
| 49* | 95 | 5 | 0 | 67.17 | 11.41 | 19.00 | 0.20 | 2.22 | 9,700 | 3.8 | 1.2 | $1 \times 10^7$ | $2.3 \times 10^{11}$ |
| 50 | 95 | 5 | 0.05 | 67.17 | 11.41 | 19.00 | 0.20 | 2.22 | 10,100 | 2.1 | 0.7 | $5 \times 10^9$ | $6.8 \times 10^{11}$ |
| 51 | 95 | 5 | 0.5 | 67.17 | 11.41 | 19.00 | 0.20 | 2.22 | 9,900 | 1.6 | 0.5 | $7 \times 10^{11}$ | $4.5 \times 10^{12}$ |
| 52 | 95 | 5 | 5.0 | 67.17 | 11.41 | 19.00 | 0.20 | 2.22 | 7,100 | 1.9 | 0.7 | $2 \times 10^9$ | $1.1 \times 10^{12}$ |
| 53* | 95 | 5 | 10.0 | 67.17 | 11.41 | 19.00 | 0.20 | 2.22 | 3,600 | 4.5 | 1.5 | $2 \times 10^7$ | $9.0 \times 10^9$ |

| Sample No. | Basic Ingredients (mol %) Pb(Fe½Nb½)O₃ | Basic Ingredients (mol %) Pb(Mg⅓Ta⅔)O₃ | Additive (wt %) Pb(Mn⅓Ta⅔)O₃ | PbO | Fe₂O₃ | Nb₂O₅ | MgO | Ta₂O₅ | $\epsilon_s$ | tan δ 20° C. | tan δ 85° C. | IR | ρ(Ω-cm) |
|---|---|---|---|---|---|---|---|---|---|---|---|---|---|
| 54* | 30 | 70 | 0 | 60.72 | 3.26 | 5.42 | 2.56 | 28.04 | 5,100 | 1.2 | 0.5 | $8 \times 10^7$ | $4.5 \times 10^{12}$ |
| 55 | 30 | 70 | 0.05 | 60.72 | 3.26 | 5.42 | 2.56 | 28.04 | 5,150 | 0.8 | 0.4 | $8 \times 10^9$ | $9.0 \times 10^{12}$ |
| 56 | 30 | 70 | 0.5 | 60.72 | 3.26 | 5.42 | 2.56 | 28.04 | 5,220 | 0.3 | 0.2 | $4 \times 10^{11}$ | $9.0 \times 10^{12}$ |
| 57 | 30 | 70 | 5.0 | 60.72 | 3.26 | 5.42 | 2.56 | 28.04 | 4,950 | 0.8 | 0.5 | $5 \times 10^{10}$ | $1.1 \times 10^{12}$ |
| 58* | 30 | 70 | 10.0 | 60.72 | 3.26 | 5.42 | 2.56 | 28.04 | 3,600 | 4.3 | 1.7 | $5 \times 10^7$ | $1.6 \times 10^{10}$ |
| 59* | 70 | 30 | 0 | 64.53 | 8.08 | 13.45 | 1.16 | 12.78 | 17,600 | 2.0 | 0.8 | $5 \times 10^7$ | $1.6 \times 10^{12}$ |
| 60 | 70 | 30 | 0.05 | 64.53 | 8.08 | 13.45 | 1.16 | 12.78 | 17,600 | 0.9 | 0.5 | $7 \times 10^9$ | $1.8 \times 10^{12}$ |
| 61 | 70 | 30 | 0.5 | 64.53 | 8.08 | 13.45 | 1.16 | 12.78 | 17,700 | 0.4 | 0.3 | $2 \times 10^{11}$ | $4.5 \times 10^{12}$ |
| 62 | 70 | 30 | 5.0 | 64.53 | 8.08 | 13.45 | 1.16 | 12.78 | 16,200 | 1.4 | 0.8 | $4 \times 10^9$ | $2.3 \times 10^{11}$ |
| 63* | 70 | 30 | 10.0 | 64.53 | 8.08 | 13.45 | 1.16 | 12.78 | 12,100 | 3.6 | 1.7 | $3 \times 10^7$ | $9.0 \times 10^9$ |
| 64* | 95 | 5 | 0 | 67.17 | 11.41 | 19.00 | 0.20 | 2.22 | 9,700 | 3.8 | 1.2 | $1 \times 10^7$ | $2.3 \times 10^{11}$ |
| 65 | 95 | 5 | 0.05 | 67.17 | 11.41 | 19.00 | 0.20 | 2.22 | 9,800 | 2.2 | 0.8 | $6 \times 10^9$ | $9.0 \times 10^{11}$ |
| 66 | 95 | 5 | 0.5 | 67.17 | 11.41 | 19.00 | 0.20 | 2.22 | 9,900 | 1.4 | 0.5 | $2 \times 10^{11}$ | $1.8 \times 10^{12}$ |
| 67 | 95 | 5 | 5.0 | 67.17 | 11.41 | 19.00 | 0.20 | 2.22 | 6,800 | 2.0 | 0.6 | $4 \times 10^9$ | $4.5 \times 10^{11}$ |
| 68* | 95 | 5 | 10.0 | 67.17 | 11.41 | 19.00 | 0.20 | 2.22 | 3,500 | 4.7 | 1.3 | $4 \times 10^7$ | $1.1 \times 10^{10}$ |

| Sample No. | Basic Ingredients (mol %) Pb(Fe½Nb½)O₃ | Basic Ingredients (mol %) Pb(Mg⅓Ta⅔)O₃ | Additive (wt %) MnO | PbO | Fe₂O₃ | Nb₂O₅ | MgO | Ta₂O₅ | $\epsilon_s$ | tan δ 20° C. | tan δ 85° C. | IR | ρ(Ω-cm) |
|---|---|---|---|---|---|---|---|---|---|---|---|---|---|
| 69* | 60 | 40 | 0 | 64.45 | 6.92 | 11.51 | 1.55 | 15.57 | 14,550 | 1.5 | 0.8 | $8 \times 10^7$ | $2.0 \times 10^{12}$ |
| 70 | 60 | 40 | 0.001 | 64.45 | 6.92 | 11.51 | 1.55 | 15.57 | 14,400 | 0.9 | 0.5 | $9 \times 10^9$ | $2.3 \times 10^{12}$ |
| 71 | 60 | 40 | 0.005 | 64.45 | 6.92 | 11.51 | 1.55 | 15.57 | 13,200 | 0.7 | 0.3 | $7 \times 10^{10}$ | $6.8 \times 10^{12}$ |
| 72 | 60 | 40 | 0.1 | 64.45 | 6.92 | 11.51 | 1.55 | 15.57 | 12,200 | 0.5 | 0.3 | $6 \times 10^{10}$ | $6.8 \times 10^{12}$ |
| 73 | 60 | 40 | 0.5 | 64.45 | 6.92 | 11.51 | 1.55 | 15.57 | 9,300 | 1.0 | 0.6 | $4 \times 10^{10}$ | $1.8 \times 10^{12}$ |
| 74 | 60 | 40 | 1.0 | 64.45 | 6.92 | 11.51 | 1.55 | 15.57 | 8,000 | 1.1 | 0.6 | $2 \times 10^{10}$ | $1.1 \times 10^{12}$ |
| 75* | 60 | 40 | 1.5 | 64.45 | 6.92 | 11.51 | 1.55 | 15.57 | 7,680 | 3.8 | 1.7 | $6 \times 10^8$ | $1.4 \times 10^{11}$ |
| 76* | 70 | 30 | 0 | 64.53 | 8.08 | 13.45 | 1.16 | 12.78 | 18,000 | 1.8 | 0.8 | $5 \times 10^7$ | $1.6 \times 10^{12}$ |
| 77 | 70 | 30 | 0.005 | 64.53 | 8.08 | 13.45 | 1.16 | 12.78 | 17,900 | 0.9 | 0.3 | $5 \times 10^5$ | $2.0 \times 10^{12}$ |
| 78 | 70 | 30 | 0.5 | 64.53 | 8.08 | 13.45 | 1.16 | 12.78 | 12,200 | 0.6 | 0.3 | $4 \times 10^{10}$ | $2.3 \times 10^{12}$ |
| 79 | 70 | 30 | 1.0 | 64.53 | 8.08 | 13.45 | 1.16 | 12.78 | 11,800 | 1.2 | 0.5 | $2 \times 10^{10}$ | $1.8 \times 10^{10}$ |
| 80* | 70 | 30 | 2.0 | 64.53 | 8.08 | 13.45 | 1.16 | 12.78 | 9,770 | 4.0 | 1.4 | $4 \times 10^8$ | $1.4 \times 10^{10}$ |
| 81* | 80 | 20 | 0 | 65.56 | 9.83 | 15.62 | 0.79 | 8.66 | 15,400 | 3.2 | 1.1 | $9 \times 10^7$ | $1.1 \times 10^{12}$ |
| 82 | 80 | 20 | 0.003 | 65.56 | 9.83 | 15.62 | 0.79 | 8.66 | 14,100 | 1.2 | 0.5 | $7 \times 10^{10}$ | $1.6 \times 10^{12}$ |
| 83 | 80 | 20 | 0.1 | 65.56 | 9.83 | 15.62 | 0.79 | 8.66 | 13,000 | 0.8 | 0.3 | $4 \times 10^{10}$ | $9.0 \times 10^{12}$ |
| 84 | 80 | 20 | 0.5 | 65.56 | 9.83 | 15.62 | 0.79 | 8.66 | 8,400 | 1.3 | 0.5 | $6 \times 10^{10}$ | $1.4 \times 10^{12}$ |
| 85 | 80 | 20 | 1.0 | 65.56 | 9.83 | 15.62 | 0.79 | 8.66 | 7,700 | 2.0 | 0.7 | $3 \times 10^{10}$ | $6.8 \times 10^{11}$ |
| 86 | 80 | 20 | 1.5 | 65.56 | 9.83 | 15.62 | 0.79 | 8.66 | 6,150 | 6.0 | 2.2 | $9 \times 10^8$ | $2.0 \times 10^{10}$ |

Table 1-continued

| Sample No. | Basic Ingredients (mol %) Pb(Fe½Nb½)O₃ | Pb(Mg⅓Ta⅔)O₃ | Additive (wt %) Li₂O | Proportion of Basic Oxides (wt %) PbO | Fe₂O₃ | Nb₂O₅ | MgO | Ta₂O₅ | Electric Properties $\epsilon_s$ | tan δ |
|---|---|---|---|---|---|---|---|---|---|---|
| 87* | 70 | 30 | 0 | 64.53 | 8.08 | 13.45 | 1.16 | 12.78 | 18,000 | 1.8 |
| 88 | 70 | 30 | 0.01 | 64.53 | 8.08 | 13.45 | 1.16 | 12.78 | 17,400 | 1.2 |
| 89 | 70 | 30 | 0.05 | 64.53 | 8.08 | 13.45 | 1.16 | 12.78 | 15,300 | 0.7 |
| 90 | 70 | 30 | 0.1 | 64.53 | 8.08 | 13.45 | 1.16 | 12.78 | 13,600 | 0.5 |
| 91 | 70 | 30 | 0.5 | 64.53 | 8.08 | 13.45 | 1.16 | 12.78 | 9,900 | 0.5 |
| 92 | 70 | 30 | 2 | 64.53 | 8.08 | 13.45 | 1.16 | 12.78 | 8,600 | 1.1 |
| 93* | 70 | 30 | 5 | 64.53 | 8.08 | 13.45 | 1.16 | 12.78 | 6,200 | 7.5 |
| 94* | 45 | 55 | 0 | 61.98 | 4.99 | 8.30 | 2.24 | 22.49 | 8,650 | 1.5 |
| 95 | 45 | 55 | 0.01 | 61.98 | 4.99 | 8.30 | 2.24 | 22.49 | 8,400 | 0.9 |
| 96 | 45 | 55 | 0.05 | 61.98 | 4.99 | 8.30 | 2.24 | 22.49 | 7,900 | 0.6 |
| 97 | 45 | 55 | 0.1 | 61.98 | 4.99 | 8.30 | 2.24 | 22.49 | 7,530 | 0.5 |
| 98 | 45 | 55 | 0.5 | 61.98 | 4.99 | 8.30 | 2.24 | 22.49 | 6,050 | 0.6 |
| 99 | 45 | 55 | 2 | 61.98 | 4.99 | 8.30 | 2.24 | 22.49 | 5,600 | 0.9 |
| 100* | 45 | 55 | 5 | 61.98 | 4.99 | 8.30 | 2.24 | 22.49 | 3,700 | 6.2 |

| Sample No. | Basic Ingredients (mol %) Pb(Fe½Nb½)O₃ | Pb(Mg⅓Ta⅔)O₃ | Additive (wt %) Cr₂O₃ | Proportion of Basic Oxides (wt %) PbO | Fe₂O₃ | Nb₂O₅ | MgO | Ta₂O₅ | $\epsilon_s$ | Electric Properties tan δ 20° C. | 85° C. | IR | ρ(Ω-cm) |
|---|---|---|---|---|---|---|---|---|---|---|---|---|---|
| 101* | 95 | 5 | 0 | 67.17 | 11.41 | 19.00 | 0.20 | 2.22 | 9,750 | 3.7 | 1.2 | 1×10⁷ | 2.3×10¹¹ |
| 102 | 95 | 5 | 0.05 | 67.17 | 11.41 | 19.00 | 0.20 | 2.22 | 9,920 | 2.9 | 1.0 | 3×10 8 | 9.0×10¹¹ |
| 103 | 95 | 5 | 0.5 | 67.17 | 11.41 | 19.00 | 0.20 | 2.22 | 10,300 | 2.2 | 0.8 | 2×10¹⁰ | 1.4×10¹² |
| 104 | 95 | 5 | 1.0 | 67.17 | 11.41 | 19.00 | 0.20 | 2.22 | 9,800 | 1.7 | 0.7 | 8×10⁹ | 4.5×10¹¹ |
| 105 | 95 | 5 | 2.0 | 67.17 | 11.41 | 19.00 | 0.20 | 2.22 | 9,280 | 2.4 | 0.8 | 2×10⁸ | 2.3×10¹¹ |
| 106* | 95 | 5 | 3.0 | 67.17 | 11.41 | 19.00 | 0.20 | 2.22 | 7,110 | 4.8 | 2.2 | 3×10⁷ | 1.4×10¹⁰ |
| 107* | 30 | 70 | 0 | 60.72 | 3.26 | 5.42 | 2.56 | 28.04 | 5,210 | 1.1 | 0.5 | 5×10⁷ | 4.5×10¹⁰ |
| 108 | 30 | 70 | 0.05 | 60.72 | 3.26 | 5.42 | 2.56 | 28.04 | 5,290 | 0.9 | 0.5 | 8×10⁸ | 9.0×10¹² |
| 109 | 30 | 70 | 0.5 | 60.72 | 3.26 | 5.42 | 2.56 | 28.04 | 5,460 | 0.7 | 0.5 | 3×10⁹ | 1.4×10¹³ |
| 110 | 30 | 70 | 1.0 | 60.72 | 3.26 | 5.42 | 2.56 | 28.04 | 5,270 | 0.7 | 0.5 | 4×10¹⁰ | 1.4×10¹³ |
| 111 | 30 | 70 | 2.0 | 60.72 | 3.26 | 5.42 | 2.56 | 28.04 | 5,080 | 1.2 | 0.8 | 7×10⁸ | 1.4×10¹² |
| 112* | 30 | 70 | 3.0 | 60.72 | 3.26 | 5.42 | 2.56 | 28.04 | 3,740 | 3.3 | 1.3 | 3×10⁷ | 9.0×10⁹ |

| Sample No. | Basic Ingredients (mol %) Pb(Fe½Nb½)O₃ | Pb(Mg⅓Ta⅔)O₃ | Additive (wt %) CeO₂ | Proportion of Basic Oxides (wt %) PbO | Fe₂O₃ | Nb₂O₅ | MgO | Ta₂O₅ | $\epsilon_s$ | Electric Properties tan δ 20° C. | 85° C. | IR | ρ(Ω-cm) |
|---|---|---|---|---|---|---|---|---|---|---|---|---|---|
| 113 | 95 | 5 | 0.05 | 67.17 | 11.41 | 19.00 | 0.20 | 2.22 | 9,920 | 2.9 | 1.0 | 3×10⁸ | 1.1×10¹² |
| 114 | 95 | 5 | 0.5 | 67.17 | 11.41 | 19.00 | 0.20 | 2.22 | 10,300 | 2.2 | 0.8 | 2×10¹⁰ | 1.6×10¹² |
| 115 | 95 | 5 | 1.0 | 67.17 | 11.41 | 19.00 | 0.20 | 2.22 | 9,880 | 1.7 | 0.8 | 8×10⁹ | 9.0×10¹¹ |
| 116 | 95 | 5 | 2.0 | 67.17 | 11.41 | 19.00 | 0.20 | 2.22 | 9,280 | 2.4 | 0.9 | 2×10⁸ | 4.5×10¹¹ |
| 117* | 95 | 5 | 3.0 | 67.17 | 11.41 | 19.00 | 0.20 | 2.22 | 9,920 | 4.8 | 2.3 | 3×10⁷ | 1.4×10¹⁰ |
| 118 | 30 | 70 | 0.05 | 60.72 | 3.26 | 5.42 | 2.56 | 28.04 | 5,290 | 0.9 | 0.9 | 8×10⁸ | 1.4×10¹² |
| 119 | 30 | 70 | 0.5 | 60.72 | 3.26 | 5.42 | 2.56 | 28.04 | 5,460 | 0.7 | 0.3 | 3×10⁹ | 1.6×10¹² |
| 120 | 30 | 70 | 1.0 | 60.72 | 3.26 | 5.42 | 2.56 | 28.04 | 5,270 | 0.7 | 0.4 | 4×10¹⁰ | 2.0×10¹² |
| 121 | 30 | 70 | 2.0 | 60.72 | 3.26 | 5.42 | 2.56 | 28.04 | 5,080 | 1.2 | 0.7 | 7×10⁸ | 1.4×10¹² |
| 122* | 30 | 70 | 3.0 | 60.72 | 3.26 | 5.42 | 2.56 | 28.04 | 3,740 | 3.3 | 1.2 | 3×10⁷ | 1.6×10¹⁰ |

The sintering temperatures and the temperature dependence of the dielectric constant of Samples 1 through 8 are shown in Table 2.

Table 2

| Sample No. | Temperature Dependence of at 85° C. $\xi_s$(%) | Sintering Temperature (°C.) |
|---|---|---|
| 1 | −37.1 | 940 |
| 2 | −35.0 | 940 |
| 3 | −65.1 | 940 |
| 4 | −65.3 | 940 |
| 5 | −59.3 | 940 |
| 6 | +37.2 | 940 |
| 7 | +19.0 | 980 |
| 8 | +17.0 | 1050 |

The sintering temperatures of Samples from 87 to 100 are shown in Table 3.

Table 3

| Sample No. | Additive (wt %) Li₂O | Sintering Temperature (°C.) |
|---|---|---|
| 87* | 0 | 940 |
| 88 | 0.01 | 900 |
| 89 | 0.05 | 860 |
| 90 | 0.1 | 860 |
| 91 | 0.5 | 820 |
| 92 | 2 | 780 |
| 93* | 5 | 750 |
| 94* | 0 | 940 |
| 95 | 0.01 | 900 |
| 96 | 0.05 | 860 |
| 97 | 0.1 | 860 |
| 98 | 0.5 | 820 |
| 99 | 2 | 780 |
| 100* | 5 | 750 |

The sintering temperatures of Samples other than those mentioned in Tables 2 and 3, above, were as follows. The sintering temperature of the control samples was 1000° C. The sintering temperature of the samples according to the present invention containing Pb(Mn½W½)O₃, Pb(Mn½Nb⅔O)₃ Pb(Mn½Ta⅔)O₃, Pb(Mn⅔W⅓)O₃, Li₂O, MnO, Pb(Mn½Nb⅔)O₃, Cr₂O₃ and CeO₂ was a predetermined temperature in the range of from 850° to 950° C. The sintering temperature of the samples containing $Pb(Mn_{\frac{1}{3}}Ta_{\frac{2}{3}})O_3$ was a predetermined temperature in the range of from 700° to 850° C.

The specimens having the composition of Sample 5 and a control samples having a composition of 63.63 mol % of $Pb(Fe_{\frac{1}{2}}Nb_{\frac{1}{2}})O_3$-35.82 mol % of $Pb(Fe_{\frac{2}{3}}W_{\frac{1}{3}})O_3$ -0.5 wt % of $Pb(Mn_{\frac{1}{3}}Nb_{\frac{2}{3}})O_3$ were sintered at 900°, 950°, 1000° and 1080° C., and the insulation resistance of these samples was measured. The measurement result is as shown in Table 4.

Table 4

| Sintering Temperature (°C.) | IR ( ) | |
|---|---|---|
| | No. 5 | CONTROL |
| 900 | $6 \times 10^{10}$ | $6 \times 10^9$ |
| 950 | $7 \times 10^{10}$ | $2 \times 10^{10}$ |
| 1000 | $7 \times 10^{10}$ | $8 \times 10^9$ |
| 1080 | $6 \times 10^{10}$ | $7 \times 10^8$ |

The insulation resistance of Sample No. 5 and the control sample mentioned above was measured at 20°, 40°, 60°, 80° and 100° C. The measurement result was as shown in Table 5.

Table 5

| Measuring Temperature (°C.) | IR (Ω) | |
|---|---|---|
| | No. 5 | CONTROL |
| 20 | $7 \times 10^{10}$ | $2 \times 10^{10}$ |
| 40 | $7 \times 10^{10}$ | $9 \times 10^9$ |
| 60 | $7 \times 10^{10}$ | $3 \times 10^9$ |
| 80 | $6 \times 10^{10}$ | $8 \times 10^8$ |
| 100 | $5 \times 10^{10}$ | $2 \times 10^8$ |

Sintering temperature was 950° C.

What we claim is:

1. A high dielectric constant type-, ceramic composition, referred to as the basic ceramic composition, consisting essentially of from 60.72 to 67.17% of PbO, from 3.26 to 11.41% of $Fe_2O_3$, from 5.42 to 19.00% of $Nb_2O_5$, from 0.20 to 2.56% of MgO and from 2.22 to 28.04% of $Ta_2O_5$, all percentages being by weight based on the basic composition.

2. A high dielectric constant type-, ceramic composition according to claim 1, wherein the dielectric constant of the basic composition is from 5000 to 18,000 and the dielectric loss (tan δ at 1 KHz) is from 1.0 to 3.6%.

3. A high dielectric constant type-, ceramic composition according to claim 1, wherein the basic composition comprises from 64.0 to 65.0% of PbO, from 6.9 to 8.1% of $Fe_2O_3$, from 11.0 to 14.0% of $Nb_2O_5$, 1.1 to 1.6% of MgO, and from 12.0 to 16.0% of $Ta_2O_5$.

4. A high dielectric constant type-, ceramic composition according to claim 1, wherein said ceramic composition further comprises $Pb(Mn_{\frac{2}{3}}W_{\frac{1}{3}})O_3$ in an amount of from 0.05 to 5.0 parts by weight based on 100 weight parts of the basic composition.

5. A high dielectric constant type-, ceramic composition according to claim 4, wherein said ceramic composition exhibits a dielectric constant of from approximately 5100 to 18,000, a dielectric loss (tan δ at 1 KHz) of from 0.3 to 2.0%, and an insulation resistance of from $1 \times 10^9$ to $6 \times 10^{11}$Ω.

6. A high dielectric constant type, ceramic composition according to claim 4, wherein said $Pb(Mn_{\frac{2}{3}}W_{\frac{1}{3}})O_3$ content is from 0.5 to 5.0 part by weight, and the basic composition is preferably from 64.53 to 67.17% by of PbO, from 8.08 to 11.41% of $Fe_2O_3$, from 13.45 to 19.00% of $Nb_2O_5$ from 2.22 to 12.78% $Ta_2O_5$ and from 0.20 to 1.16% of MgO.

7. A high dielectric constant type-, ceramic composition according to claim 6, wherein the basic composition comprises from 64.53 to 65% of PbO, from 8.08 to 9% of $Fe_2O_3$, from 13.45 to 14% of $Nb_2O_5$, from 1 to 1.16% of MgO and from 12 to 12.78% of $Ta_2O_5$, and said ceramic composition exhibits a dielectric constant of higher than 15,000, a dielectric loss (tan δ at 1 KHz) of less than approximately 1.0%, and an insulation resistance of not less than $4 \times 10^{11}$Ω.

8. A high dielectric constant type-, ceramic composition according to claim 1, wherein said ceramic composition further comprises $Pb(Mn_{\frac{2}{3}}W_{\frac{1}{3}})O_3$ in an amount of from 0.05 to 5.0 parts by weight based on 100 weight parts of the basic composition.

9. A high dielectric constant type-, ceramic composition according to claim 8, wherein said composition exhibits a dielectric constant of from approximately 5100 to 18,700, a dielectric loss (tan δ at 1 KHz) of from 0.2 to 2.0%, and an insulation resistance of 4 to $10^8$Ω or more.

10. A high dielectric constant type-, ceramic composition according to claim 8, the content of said $Pb(Mn_{\frac{2}{3}}W_{\frac{1}{3}})O_3$ is from 0.05 to 5.0 parts by weight, and the basic composition is from 64.53 to 67.17% of PbO, from 8.08 to 11.41% of $Fe_2O_3$, from 13.45 to 19.00% of $Nb_2O_5$, from 2.22 to 12.78% of $Ta_2O_5$ and from 0.20 to 1.16% of MgO, and said ceramic composition exhibits a dielectric loss (tan δ at 1 KHz) of 1.4% or less and the dielectric constant of more than 10,000.

11. A high dielectric constant type, ceramic composition according to claim 10, wherein the basic composition comprises from 64.53 to 65% of PbO, from 8.08 to 9% of $Fe_2O_3$, from 13.45 to 14% of $Nb_2O_5$, from 1.16 to 2% of MgO and from 12.78 to 13% of $Ta_2O_5$, and said ceramic composition exhibits a dielectric constant of more than 16,000.

12. A high dielectric constant type-, ceramic composition according to claim 1, wherein said ceramic composition further comprises $Pb(Mn_{\frac{1}{3}}Nb_{\frac{2}{3}})O_3$ in an amount of from 0.05 to 5.0 parts by weight based on 100 weight parts of the basic composition.

13. A high dielectric constant type-, ceramic composition according to claim 12, wherein said ceramic composition exhibits a dielectric constant of from approximately 4900 to 17,600, a dielectric loss (tan δ at 1 KHz) of from 0.12 to 2.1%, and an insulation resistance of from $3 \times 10^9$ to $8 \times 10^{11}$Ω.

14. A high dielectric constant type-, ceramic composition according to claim 13, wherein the content of said $Pb(Mn_{\frac{1}{3}}Nb_{\frac{2}{3}})O_3$ is from 0.5 to 5.0 parts by weight, and the basic composition is from 64.53 to 67.17% by weight of PbO, from 8.08 to 11.41% by weight of $Fe_2O_3$, from 13.45 to 19.00% by weight of $Nb_2O_5$, from 0.20 to 1.16% by weight of MgO, and from 2.22 to 12.78% by weight of $Ta_2O_5$.

15. A high dielectric constant type-, ceramic composition according to claim 14, wherein the basic composition is from 64.53 to 65% by weight of PbO, from 8.08 to 9% by weight of $Fe_2O_3$, from 13.45 to 14% by weight of $Nb_2O_5$, from 1 to 1.16% by weight of MgO, and from 12 to 12.78% by weight of $Ta_2O_5$, and said ceramic composition exhibits a dielectric constant of more than 16,000 and a dielectric constant (tan δ at 1 KHz) of 1.2% or less.

16. A high dielectric constant type-, ceramic composition according to claim 1, wherein said ceramic composition further comprises MnO in an amount of from 0.001 to 1.0 part by weight based on 100 weight parts of the basic ceramic composition.

17. A high dielectric constant type-, ceramic composition according to claim 16, wherein said ceramic composition exhibits a dielectric constant of from approximately 7700 to 14,400 a dielectric loss (tan δ at 1 KHz) of from 0.5 to 2.0%, and an insulation resistance of from $9 \times 10^9$ to $7 \times 10^{10} \Omega$.

18. A high dielectric constant type-, ceramic composition according to claim 17, wherein the content of said MnO is from 0.001 to 0.1 part by weight, and the basic composition is from 64.45 to 65.56% PbO, from 6.92 to 9.83% of $Fe_2O_3$, from 11.51 to 15.62% of $Nb_2O_5$ and from 0.79 to 1.55% of MgO, and from 8.66 to 15.57% of $Ta_2O_5$, and said ceramic composition exhibits the dielectric constant of more than 12,000 a dielectric loss (tan δ at 1 KHz) of 1.2% or less, and the insulation resistance of $4 \times 10^{10} \Omega$ or more.

19. A high dielectric constant type-, ceramic composition according to claim 18, wherein the basic composition is preferably from 64 to 65.56% by weight of PbO, from 8 to 9.83% by weight of $Fe_2O_3$, from 13 to 14% by weight of $Nb_2O_5$, from 1 to 1.55% by weight of MgO, and from 12 to 13% by weight of $Ta_2O_5$, and said ceramic composition exhibits a dielectric constant of approximately 17,000 and the dielectric loss (tan δ at 1 KHz) of 0.9% or less.

20. A high dielectric constant type-, ceramic composition according to claim 1, wherein said ceramic composition further comprises $Pb(Mn_{\frac{1}{3}}Ta_{\frac{2}{3}})O_3$ in an amount of from 0.05 to 5.0 parts by weight based on 100 weight parts of the basic ceramic composition.

21. A high dielectric constant type-, ceramic composition according to claim 20, said ceramic composition exhibits a dielectric constant of from approximately 4950 to 17,700, a dielectric loss (tan δ at 1 KHz) of from 0.1 to 2.2%, and an insulation resistance of from $4 \times 10^9$ to $4 \times 10^{11} \Omega$.

22. A high dielectric constant type-, ceramic composition according to claim 21, wherein the basic composition is from 64 to 65% by weight PbO, from 8 to 9% of $Fe_2O_3$, from 13 to 14% of $Nb_2O_5$ from 1 to 2% of MgO, from 12 to 13% of $Ta_2O_5$, and said ceramic composition exhibits a dielectric loss (tan δ at 1 KHz) of 1.4% or less, an insulation resistance of $7 \times 10^9$ or more, and the dielectric constant is approximately 16,000 or more.

23. A high dielectric constant type-, ceramic composition according to claim 1, wherein said ceramic composition further comprises $Li_2O$ in an amount of from 0.01 to 2.0 parts by weight based on 100 weight parts of the basic composition.

24. A high dielectric constant type-, ceramic composition according to claim 23, wherein said ceramic composition exhibits a dielectric constant of from 5600 to 17,400, dielectric loss (tan δ at 1 KHz) of from 0.5 to 1.2%.

25. A high dielectric constant type-, ceramic composition according to claim 23, wherein the content of said $Li_2O$ is from 0.01 to 0.5 part by weight, and the basic composition is from 64 to 65% PbO, from 8 to 9% of $Fe_2O_3$, from 13 to 14% of $Nb_2O_5$ and from 1 to 2% of MgO, and said ceramic composition exhibits a dielectric loss of (tan δ at 1 KHz) of 1.2% or less and the dielectric constnat of approximately 1000 or more.

26. A high dielectric constant type-, ceramic composition according to cliam 1, wherein said ceramic composition further comprises at least one member selected from the group consisting of $Cr_2O_3$ and $CeO_2$ in an amount of from 0.05 to 2.0 parts by weight based on 100 parts of the basic composition.

27. A high dielectric constant type-, ceramic composition according to claim 26, wherein said ceramic composition exhibits a dielectric constant of from approximately 5000 to 10,300, a dielectric loss (tan δ at 1 KHz) of from 0.7 to 2.4%, and an insulation resistance of from $2 \times 10^8$ to $4 \times 10^{10} \Omega$.

28. A high dielectric constant type-, ceramic composition according to claim 26, wherein the content of said at least one member is from 0.05 to 2.0 part by weight, and the basic composition is from 67 to 68% of PbO, from 11 to 12% of $Fe_2O_3$, from 18 to 19% of $Nb_2O_5$ and from 0.20 to 1.00% of MgO, and said ceramic composition exhibits a dielectric constant of approximately 10,000.

* * * * *

UNITED STATES PATENT AND TRADEMARK OFFICE
CERTIFICATE OF CORRECTION

PATENT NO. : 4,216,103
DATED : Aug. 5, 1980
INVENTOR(S) : Fujiwara et al

It is certified that error appears in the above—identified patent and that said Letters Patent is hereby corrected as shown below:

Col. 2, line 5, change "compostoin" to --composition--.

Col. 2, line 58, after "composition" delete "and".

Col. 4, line 14, change "correspond" to --corresponds--.

Col. 4, line 37, change "measureing" to --measuring--.

Col. 4, line 59, after "ceramic" delete "capable".

Col. 4, line 61, after "lower" insert --than--.

Col. 4, line 62, after "5100 to" insert --18,100--.

Col. 5, line 32, change "$Pb(Mn_{166}Nb_{170})O_3$" to --$Pb(Mn_{1/3}Nb_{2/3})O_3$--

Col. 5, line 62, change "fall" to --falls--.

Col. 6, line 28, delete "basic composition".

Col. 6, line 49, change "utifized" to --utilized--.

Col. 7, line 28, change "propertion" to --proportion--.

Col. 8, line 12, change "of", second occurrence, to -- and --.

Table I (First Chart), in the third column under Basic Ingredients (mol %), change "$Pb(Mg_{1/3}Ta_{2/3}O_3)$" to --$Pb(Mg_{1/3}Ta_{2/3})O_3$--.

continued ...

UNITED STATES PATENT AND TRADEMARK OFFICE
CERTIFICATE OF CORRECTION

PATENT NO. : 4,216,103
DATED : Aug. 5, 1980
INVENTOR(S) : Fujiwara et al

It is certified that error appears in the above—identified patent and that said Letters Patent is hereby corrected as shown below:

Table I (Eighth Chart), in the thirteenth column under IR, change "3x108" to --$3 \times 10^8$--.

Col. 12, line 66, change "$Pb(Mn_{1/3}Nb_{2/3}O)_3$" to --$Pb(Mn_{1/3}Nb_{2/3})O_3$,--.

Col. 13, line 5, change "control samples" to --control sample--.

Table 4, next to "IR" insert --$\Omega$-- inside the parenthesis.

Col. 14, line 19, change "4 to $10^8$ " to --$4 \times 10^8 \Omega$--.

Col. 16, line 21, change "constnat" to --constant--.

Col. 16, line 23, change "cliam" to --claim--.

Table 2, after "Dependence of" insert --$E_s$--.

Table 2, after "85°C." delete "$\xi_s(\%)$".

Signed and Sealed this

Twenty-seventh Day of January 1981

[SEAL]

Attest:

RENE D. TEGTMEYER

Attesting Officer

Acting Commissioner of Patents and Trademarks